(No Model.) 3 Sheets—Sheet 2.
L. GUTMANN.
ALTERNATING CURRENT MOTOR.
No. 532,549. Patented Jan. 15, 1895.
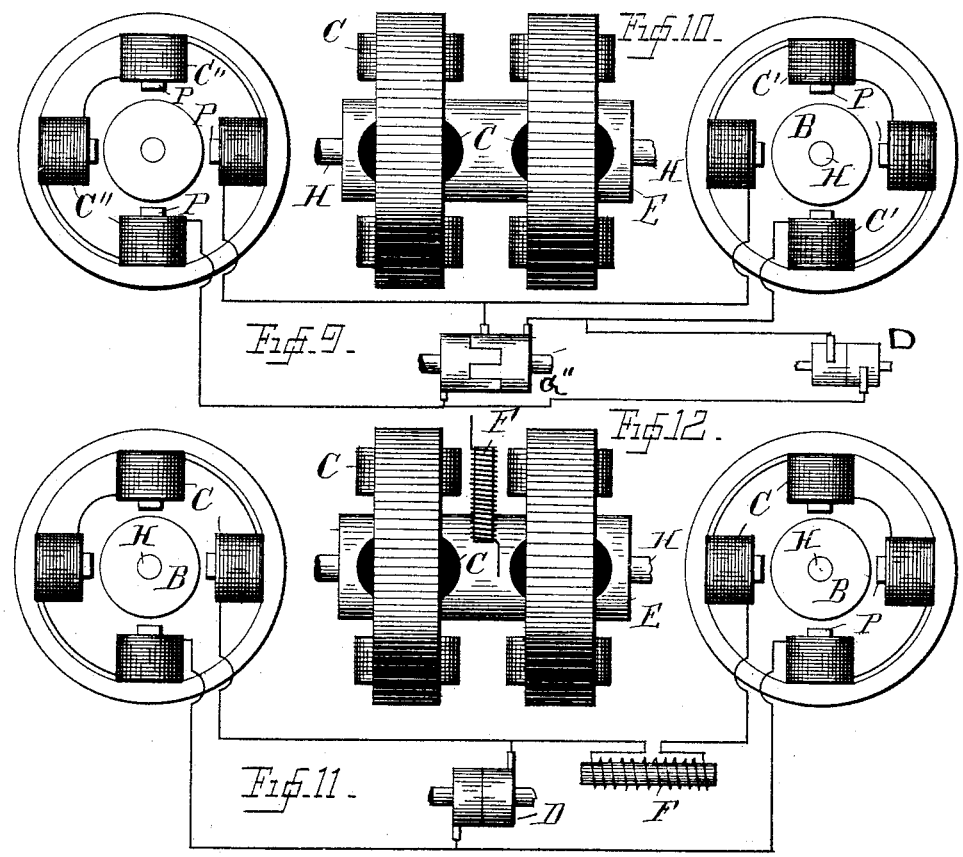
Witnesses
Will. a. Courtland
Nellie L. Pope
Inventor
Ludwig Gutmann
By his Attorney
Edward P. Thompson (No Model.) 3 Sheets—Sheet 3.
L. GUTMANN.
ALTERNATING CURRENT MOTOR.
No. 532,549. Patented Jan. 15, 1895.
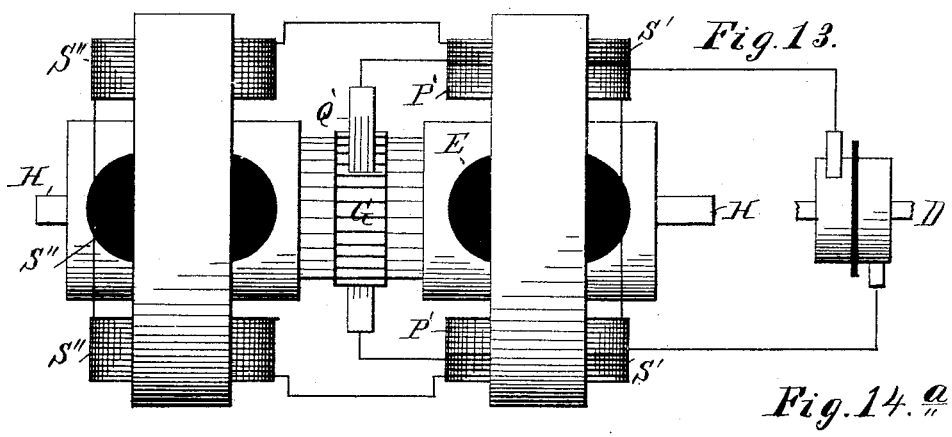
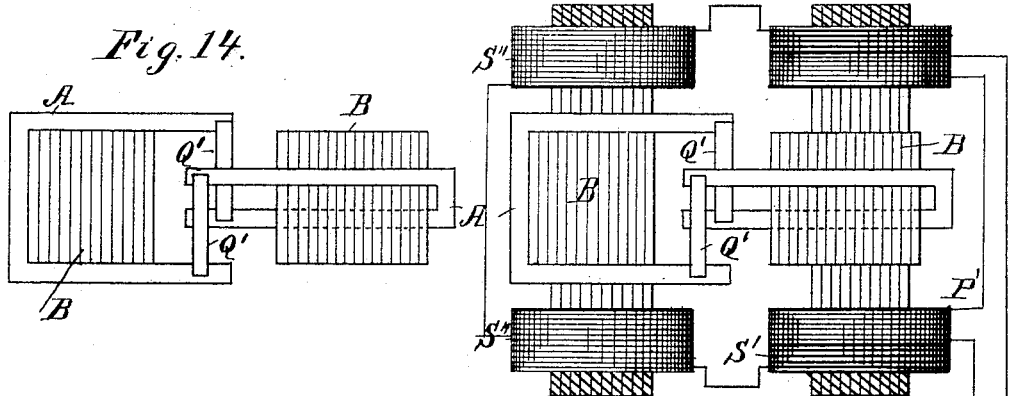
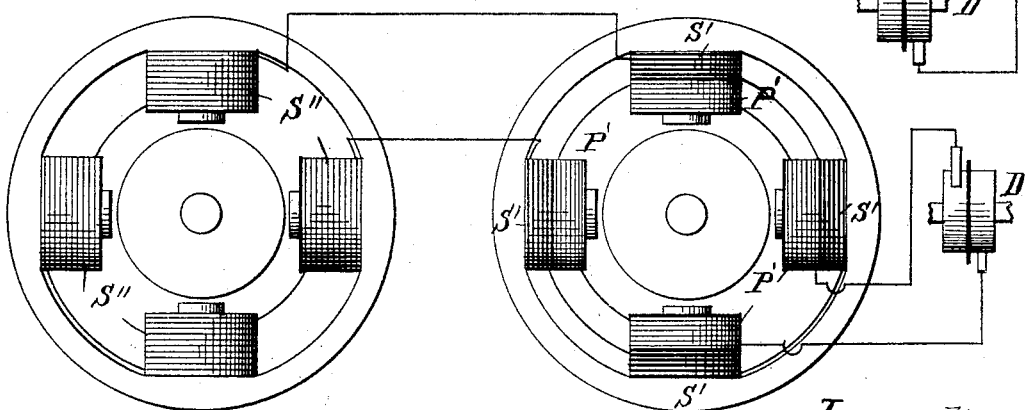
Witnesses
W. A. Courtland
Nellie L. Pope
Inventor
LUDWIG GUTMANN
BY HIS ATTORNEY
Edward P. Thompson

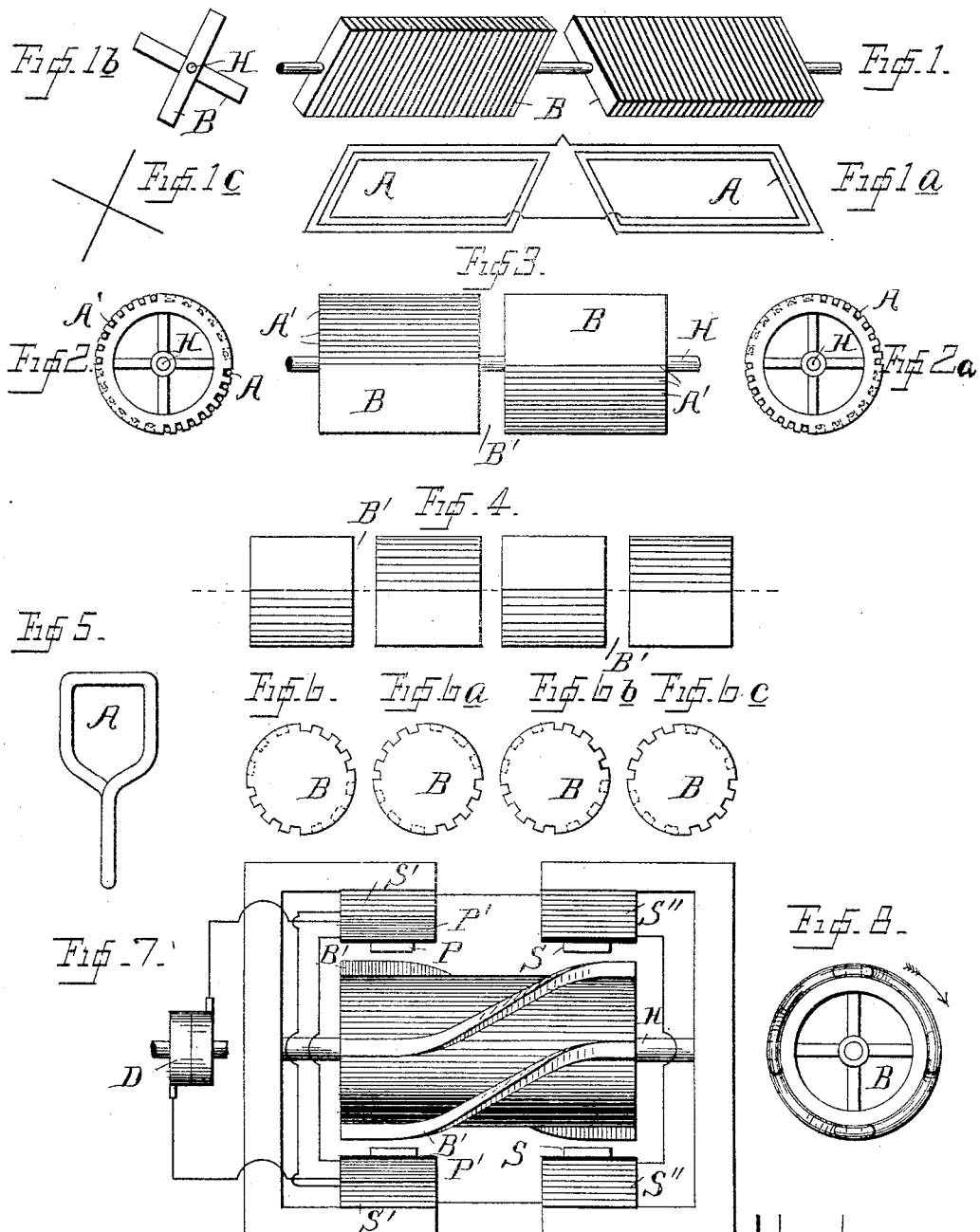

UNITED STATES PATENT OFFICE.

LUDWIG GUTMANN, OF PITTSBURG, PENNSYLVANIA.

ALTERNATING-CURRENT MOTOR.

SPECIFICATION forming part of Letters Patent No. 532,549, dated January 15, 1895.

Application filed August 27, 1890. Serial No. 363,161. (No model.)

*To all whom it may concern:*

Be it known that I, LUDWIG GUTMANN, a subject of the German Emperor, and a resident of Pittsburg, county of Allegheny, and State of Pennsylvania, have invented certain new and useful Improvements in Alternating-Electric-Current Motors, (Case No. 46,) of which the following is a specification.

My invention relates to the construction of alternating, pulsating or intermittent electric current motors. This electric motor has for its object to overcome several weak points and difficulties occurring in some types of such motors. The invention consists, first, in a peculiar armature winding adapted to considerably reduce self-induction, and, secondly, in a novel construction of field magnets.

Experiments show that if a closed coil or convolution is placed in front of an electro magnet energized by alternating or similar currents in such a manner that a maximum number of lines of force thread through the closed coil or conductors it will be repelled from the electro magnet owing to the opposing secondary field it created, and further, if the coil be suspended and is free to move, it receives a turning movement which lasts as long as said lines of force thread through it. The threading of lines will cease as soon as the coil arrives at a position at right angles to its former place, where it reaches a stable magnetic equilibrium. This opposing effect is more marked still in motors designed for commercial purposes inasmuch as the action is not between a coil and an electro magnet, but between two electro magnets, of which one (the armature) opposes the flow of the lines of force of the other from one field pole to the other, thereby considerably weakening the capacity of the motor. To have at all times an equal and maximum number of lines of force flowing, it is necessary to modify the customary way of winding the armature, and instead adopt a form of coil, the plane of one half of which lies at right angles or any other suitable angle to the other half.

Referring to the drawings, Figures 1 and 1$^a$, show special armature constructions, the former showing the core and the latter the coil. Fig. 1$^b$ is an end view of Fig. 1, and Fig. 1$^c$, an end view of 1$^a$; Figs. 2 and 2$^a$, opposite end views of an armature showing wires cut off in section; Fig. 3, a side elevation of same armature; Fig. 4, a side elevation of armature, of four parts or twists, the dotted lines showing the position of the shaft. Fig. 5 is a modified winding of Fig 1$^a$, and consists of a closed loop or band of an electric conductor such as copper, iron, steel, &c., whose two halves are twisted to stand in planes at right angles to one another; Figs. 6, 6$^a$, 6$^b$, and 6$^c$, end views of each part of armature in Fig. 4; Fig. 7, special field magnet and armature construction, combined into a complete motor; Fig. 7$^a$, a coil of one convolution for armature in Fig. 7; Fig. 8, an end view of armature construction in Fig. 7; Figs. 9, 10, 11, 12, and 13, show principally the electric connection to the field magnets and construction thereof. Fig. 9 shows a right hand and a left hand end view to the figure shown centrally between the two views. Fig. 10 is a view in elevation of which Fig. 9 shows two opposite end views. Fig. 11 shows similar to Fig. 9 two opposite end views of another motor construction. Fig. 12 is a view in elevation of the motor Fig. 11. Fig. 13, shows a means of regulation of the armature circuit. Fig. 14, shows typically two coils of the same armature, with brushes for closing one or more at a time, and Figs. 14$^a$ and 14$^b$, are modifications of Fig. 13.

In all figures, A is the armature winding.
B is the armature core.
B′ is a tooth or core projection.
Where found C, P′, S′ and S″ are field exciting coils hereinafter described.
D is an alternator, or similar generator.
E is the complete armature; F a choke magnet.
G is a commutator or armature terminals; G″ a field magnet circuit switching device.
H is the shaft; P and S field magnet poles, primary and secondary respectively.

Figs. 1 and 1$^a$, show in diagram respectively two cores and coils at right angles to one another, the coils being connected like the coils of an alternator, so that the currents in the two halves assist each other. The angle to be chosen depends on the construction and number of poles, and may be thirty degrees, sixty degrees, ninety degrees, one hundred and twenty degrees, or any other, between zero and one hundred and eighty degrees. An armature of this disposition will act in the following manner: Considering for simplicity a two polar field magnet and one armature coil of which one-half stands so, as to embrace a maximum number of lines, the second half at an angle of ninety degrees, would embrace minimum but would have a rate of cutting maximum lines of force. The field electro magnets induce a current in the armature which circulating through both halves develop poles which lie at right angles to their winding, so that when the poles of the first half coil lie centrally between the field poles, those of the second half are found in the air gap between the field poles, namely, the armature develops two sets of poles, one of which hangs behind or is in front of the other. At the same time, the armature poles lying between the field poles oppose the flow of lines through that part of the armature core, but as the remaining half, owing to its displacement, does not participate in the opposition or action, the lines of force will crowd to a greater extent through the second half of the armature core until when at an angle of forty-five degrees, the opposition or action of both halves are equal, and after the armature has been moved ninety degrees, the action of the armature halves are reversed, and the lines of force have now to thread in greater number through the first half. These two halves are shown in Figs. 2, 2ª and 3. The core is by preference of the Pacinotti type, in the grooves of which the winding is placed, but it will be observed that only one-half of the core is provided with a winding, and that while the core is preferably provided with teeth all around as shown by dotted lines, only every alternate ninety degrees of the core is made use of for locating the winding. Fig. 2, shows the two halves of the armature core mounted on the shaft H, and the grooves receiving the winding are marked A′. The space between the core halves is required to connect the coils in the proper manner. The action of rotation then is caused by constructing an armature representing two or more electro magnets, in one of which poles are developed at an angle to those developed in the other while the lines of force from the field of alternating or similar character, would change in position of maximum magnetic flux and tend to oscillate along the armature in the direction of the shaft.

If only a single field energizing circuit is employed the armature core should have two or more separate cores as shown in Figs 3 and 4. The windings, of which there may be two, three, four or more placed in an axial direction, may have such an angle, that all of them connected together will describe a complete circle, three hundred and sixty degrees around the axis, so that if four coils are employed their angular displacement is ninety degrees or the angle may be such, that the four coils are equivalent to one and a half or five hundred and forty degrees, or any other suitable angle may be selected for effecting maximum energy and least number of dead points.

Fig. 5 shows a single armature coil whose application to a field magnet of suitable form enables it to obtain favorable conditions in the armature of an alternating current motor, namely the suppression of self induction. It will be noticed, that the two half coils are twisted so as to stand in planes at right angles to one another, and consequently when one part of the winding is cutting maximum lines of force, the other cuts minimum lines, or when in one part there is minimum magnetic flux due to induction in the other there will be maximum magnetic flux. This coil if applied to an armature core would require one like Fig. 3, or two sets of such coils would be required for the core structures shown in Figs. 4 and 6. It acts like a motor generator, and this disposition adopted neutralizes the self-induction in the armature. In all the former figures only one-half of the armature core has been made use of for placing the winding. In all of the following figures the winding is placed or supposed to be placed all around the core, so as to utilize all available space, and to make the motor of good efficiency. In combination with any of the field magnets used or described in the specification but a single armature core may be used. In this event the armature winding Fig. 5 must be slightly modified as shown in Fig. 7ª in which the twist is such that when one part is just in front of a field magnet pole, the other part lies midway between the poles. These coils are mounted all around the core Fig. 7 and are shown in end view in Fig. 8.

The objects to be attained in this motor, are the suppression of self induction in the field winding and consequently reduction of false currents in the supply conductors; further the prevention of self induction in the armature and in consequence the approaching of the phases of the inducing and induced currents as closely together as possible and therefore increased torque of the motor. This can be carried out in a variety of ways. One is shown in Figs. 7 and 8. Two field magnet structures are shown corresponding poles being in the same plane. These two sets of field magnets develop two magnetic fields which act on the armature conductor at right angles to one another. One of the field magnets is provided with two sets of windings, one P′, of which is closed through a suitable and preferably alternating current generator D, while the second winding S′ on the same core is connected to and closed by a single winding S″ of the second field magnet. By this disposition the field magnet itself becomes a transformer with closed secondary coils and the self-induction of the winding P′ is almost completely neutralized. The peculiar form of the armature coils Fig. 7ª is intended for this armature but they are not shown mounted on the screw-like projections of the armature core. In this case the motor is operated by primary energizing and secondary induced field currents which both act on the same armature conductor. Figs. 9 and 10 however, show the preferred motor type. It is a single phase motor with two field magnet systems and an armature shown typically having windings like Figs. 7, 7ª or others to be described below, however, all having the same fundamental characteristic that the two field magnet systems, or better the two sets of magnetic fields act at right angles to one another with respect to the armature conductor. The field magnet core consists of two separate structures whose energizing coils are in series with one another, and in circuit with the generator. Both the field magnet systems have their terminals also in contact with a circuit changer G'', which consists of two cylindrical conductors having projections extending toward one another. One terminal of either electro magnet system rests on the cylindrical part of the circuit changer G'' while their joined remaining terminals by means of a brush are within the path of the tooth projections, which in number should be equal to the number of weak points, inherent to this armature type Figs. 1ª 5, and 7ª. The weak points just mentioned are caused by the twisted armature, because thereby the lines of force from both magnets are permitted at certain relative positions of armature conductor to the two fields, to thread one and the same coil in opposite direction, which would be detrimental to the proper operation of the motor. The armature is provided with conductors like Fig. 7ª, and are placed all around the armature circumference as shown in Fig. 8. In Fig. 9, it is indicated typically.

The operation of this motor is as follows: By sending an alternating current through both the field magnets the armature is set in rotation. The conductor of one coil lying in the left hand field acts as a motor, while its right hand part acts as a transformer; and vice versa in regard to the conductors under influence of the magnetic flux of the right hand field magnet. All self-induction is therefore neutralized. However, if the armature has rotated until a coil or several have identical relation to both fields it is essential to either reverse the flow of lines of force in one field or prevent them all together as otherwise, due to the opposite flow of lines of force, the armature would be currentless. This is accomplished by circuit changer G''. It will be noticed, that the common brush of the circuit changer touches alternately different projections, and therefore the field magnets are alternately short circuited through an interval corresponding to the width of the projection, which is made of such dimensions that on reintroduction of the field magnet into the circuit the lines of force of one magnet system has no detrimental effect on the other. With an alternating current of one periodicity producing two fields acting at different points on a closed armature conductor the field circuit changer is necessary unless the armature is brought to synchronous speed. Another disposition is shown in Figs. 11 and 12. The two field electro magnets are connected in parallel to the same generator, both having simliar windings applied to the poles of a choking magnet F is placed in circuit with one of the two energizing circuits.

Fig. 13 shows a further evolution. The two parallel field magnets of the multipolar type are provided with separate windings. The energizing winding P' is connected to collector D of a suitable generator. Secondary fields coils S' mounted on the same magnet structure are connected with the coils S'' on the second structure. The armature is shown to consist of a double winding with a commutator G common to both. The armature is indicated typically while the conductors connecting the commutator segments to the windings are carried straight across to either side. The armature brushes Q' are closed circuited in this case by means of the external circuit established through the secondary field coils S' and S''.

Fig. 13 discloses a double closed armature while Fig. 14 shows a double open armature and to retain the spirit of the invention of winding Fig. 5 there is shown mounted on the cores B but a single turn or conductor A on each core structure. The extension of the conductors themselves may form the commutator, and this is indicated by placing the band brushes Q' which bridge over ninety degrees circumference of the commutator. The winding is shown to consist of heavy U shaped conductors surrounding the core or better embedded into the grooves of a toothed armature core. It will be evident, that if these conductors are located all around the core as in Figs. 8 and 13, the short circuiting band brushes Q' will close upon themselves two quadrants of conductors, displaced under an angle of ninety degrees on the two core parts, while the others remain open and inactive. Figs. 14ª and 14ᵇ show this armature inserted in a field magnet system as described with Fig. 13.

Armatures of any of the types herein disclosed may be adapted to any of the field magnet types by suitable structural changes.

There are shown armatures forming simply permanently close circuited conductors which to neutralize self-induction and to obtain a powerful torque are acted upon by two magnetic fields which latter act like two magnetic fields at right angles to one another, owing to the construction of the coil. Relatively to the latter the two fields are at right angles or intersect.

There are two armatures shown Figs. 13 and 14 evolutions of the former which are provided with commutators. Evidently it would be indifferent in which motor element I would provide the means for preventing the neutralization of armature currents. In the permanently closed conductors, Figs. 1ª, 5, and 7ª, the means have to be provided for in the field circuit. See Fig. 9. However, by the insertion of armature Fig. 13 or 14, self-induction would be neutralized and action maintained even if the field circuit changer was omitted. The reason is obvious.

Fig. 13 forms by means of the common commutator, and the common external circuit a double pass, which allows each armature part to act independently. However, any potential distribution of the conductors is equalized through one another without the necessity of the external circuit. It is similar with armature Fig. 14. In this case both field magnets Fig. 9 may also remain constantly in circuit and energized because the weak positions above alluded to are not existing in this armature, as owing to the construction, the conductors will be inactive after having left the brushes, and their reactive effect is zero, because they are open circuited and hence currentless. On the other hand the reaction to reduce self-induction from one-half armature on the other is identical with that of Fig. 5.

I claim as my invention—

1. The method of reducing self induction in an armature, which consists in producing two alternating fields of the same phase, rotating an armature coil, one part under the influence of one field and another part under the influence of the other field, so that the one part will cut a maximum number of lines of force while the other part is cutting a minimum, substantially as described.

2. The combination with a field magnet system adapted to produce two magnetic fields of the same phase, of an armature coil adapted to be rotated under the influence of both of said fields, said magnetic fields being disposed relatively to said coil so that said coil cuts a maximum number of lines of force in the one field while cutting a minimum number in the other, substantially as described.

3. The combination with a field magnet system adapted to produce two magnetic fields of the same phase, of an armature coil adapted to be rotated under the influence of both of said fields, said magnetic fields being disposed relatively to said coil so that said coil cuts a maximum number of lines of force in the one field while cutting a minimum number in the other, and means for preventing an opposing reaction of said coil upon the two fields at the weak points, substantially as described.

4. The combination with a source of single phase alternating currents, of two-field magnets energized thereby, the coils of said field magnets being connected in circuit to produce magnetic fields of the same phase, of an armature coil adapted to be rotated, one part in each of said fields, the parts thereof occupying different angular positions relatively to their respective fields, substantially as described.

5. The combination with a field magnet system adapted to produce two magnetic fields of the same phase, of an armature coil adapted to be rotated, one part in each of said fields, the parts thereof occupying different angular positions relatively to their respective fields, and means for preventing the opposing reaction of the parts of said coil upon their respective fields at the weak points, substantially as described.

6. The combination with a field magnet system adapted to produce two magnetic fields of the same phase, of an armature coil adapted to be rotated, one part in each of said fields, the parts thereof occupying different angular positions relatively to their respective fields, and means for diminishing the influence of one of said magnetic fields while the coil is passing the weak points, substantially as described.

7. The combination with a field magnet system adapted to produce two magnetic fields of the same phase, of an armature coil adapted to be rotated, one part in each of said fields, the parts thereof occupying different angular positions relatively to their respective fields, and means for short-circuiting the field coils energizing one of said magnetic fields while the coil is passing the weak points, substantially as described.

In testimony that I claim the foregoing as my invention I have signed my name, in presence of two witnesses, this 15th day of March, 1890.

LUDWIG GUTMANN.

Witnesses:
F. E. J. LITOT,
SAMUEL WALLACE.